United States Patent [19]
Powell

[11] 3,987,783
[45] Oct. 26, 1976

[54] SOLAR HEATING PANEL

[76] Inventor: Hayward Powell, 3180 Carlin Ave., Lynwood, Calif. 90262

[22] Filed: July 7, 1975

[21] Appl. No.: 593,750

[52] U.S. Cl. ............................ 126/271; 126/270
[51] Int. Cl.² ........................................... F24J 3/02
[58] Field of Search ............ 126/270, 271; 237/1 A

[56] References Cited
UNITED STATES PATENTS

| | | | |
|---|---|---|---|
| 1,068,650 | 7/1912 | Harrison | 126/271 |
| 1,250,260 | 12/1917 | Wilcox | 126/271 |
| 2,167,576 | 7/1939 | Kiser | 126/271 |
| 2,213,894 | 9/1940 | Barry | 126/271 |
| 2,311,579 | 2/1943 | Scott | 126/271 |
| 2,993,125 | 7/1961 | Geer et al. | 126/271 X |
| 3,174,915 | 3/1965 | Edlin | 126/271 |
| 3,279,527 | 10/1966 | Hardy | 126/271 |
| 3,595,216 | 7/1971 | Lanciault | 126/271 |

*Primary Examiner*—Kenneth W. Sprague
*Attorney, Agent, or Firm*—Harris, Kern, Wallen & Tinsley

[57] ABSTRACT

A solar heating panel with a heat collector mounted on an insulating base and an arched cover over said collector mounted in clips at the edges of the base. One or two flexible covers slidingly positioned in channels of the mounting clips, with a cover in sealing engagement with the insulating base and projecting downward below the top of the base. A plurality of the heating panels mounted in an array on a roof or other structure and means for circulating water through the panels for withdrawing heat.

6 Claims, 4 Drawing Figures

SOLAR HEATING PANEL

BACKGROUND OF THE INVENTION

This invention relates to solar heating and in particular to a new and improved solar heating panel. Solar energy is in one sense free, but the equipment for collecting and transporting the heat from the sun can be expensive, troublesome and unreliable. Accordingly it is an object of the present invention to provide a new and improved solar heating panel suitable for use with a plurality of similar panels in an array, which panels are inexpensive and reliable, substantially trouble-free and durable, and easy to install and maintain.

Heat collectors of various types have been used in the past. One prior art heat collector consists of a metal tube fitted with a metal sheet having an etched surface with a special heat absorbing coating. The collector units are mounted on wooden blocks or on a roof or the like with the tubes interconnected for circulating water, with the solar radiant energy being absorbed by the metal sheets and transferred to the water for heating the water. A typical use for such an installation is heating a swimming pool.

Some other solar heating devices are shown in U.S. Pat. Nos. 260,657; 2,636,129; and 3,194,228. These prior art devices incorporate various types of heat collectors and shields or covers which are complex and expensive and not readily suited for use as a cheap and simple swimming pool heater or the like.

SUMMARY OF THE INVENTION

The solar heating panel of the present invention includes a heat collector mounted on an insulating base with a cover carried on the base defining an air space between the cover and base. In the preferred configuration, the cover is a single sheet of flexible material carried in clips at opposite edges of the base with the cover in sealing engagement with the base at the top surface and with the mounting clips below the top surface. Suitable caps are provided at each end for closing the air space over the heat collector. In an alternative configuration, two spaced covers are utilized.

DESCRIPTION OF THE PREFERRED EMBODIMENTS

Figure 1:
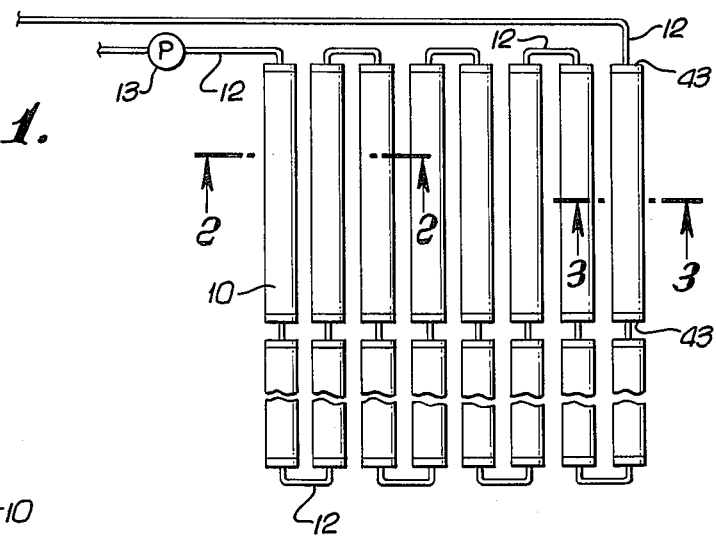
FIG. 1 is a top view of an array of solar heating panels incorporating the presently preferred embodiment of the invention.
Figure 2:
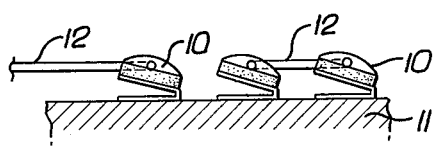
FIG. 2 is a sectional view taken along the line 2—2 of FIG. 1.

Referring to FIGS. 1 and 2, a plurality of solar heating panels 10 is mounted on a roof or other suitable support 11 in an array, preferably oriented at an angle as shown in FIG. 2 for optimum exposure to the sun. The panels 10 are interconnected by tubing 12 and a pump 13 provides for circulating a fluid, typically water, through the panels for heating the fluid.

Figure 3:
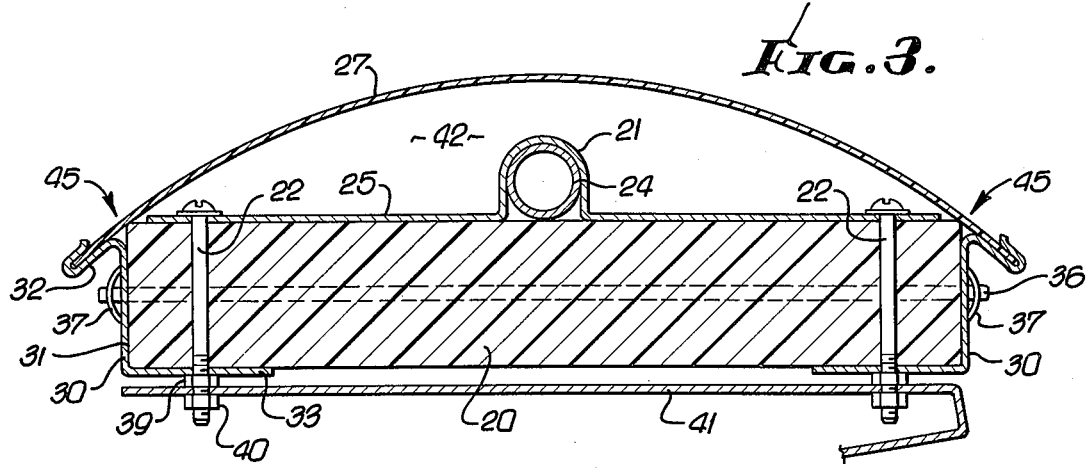
FIG. 3 is an enlarged sectional view taken along the line 3—3 of FIG. 1 showing one of the heating panels.

A typical panel is in the order of 6 inches wide and twelve feet long. The panel includes a base 20 of a thermal insulating material, typically a plastic foam, with a heat collector 21 mounted on the top of the base as by bolts 22. Various forms of heat collectors may be utilized and a preferred structure is shown in FIG. 3, consisting of a metal tube 24 with a metal plate 25 fitted tightly around the tube for good heat transfer from the plate to the tube. The plate typically is of aluminum and preferably has an etched upper surface with a black coating for maximum heat absorption.

A cover 27 is mounted on the base 20 and preferably is a thin sheet of clear flexible plastic.

Mounting clips 30 are provided at each edge of the base 20 for receiving the cover 27. The clips preferably are bent from sheet aluminum and include a first portion 31 engaging the side of the base, a second portion 32 projecting outwardly and downwardly from the portion 31, and a third portion 33 at right angles to the portion 31 projecting under the base 20. A channel is provided in the clip portion 32 for receiving the cover 27.

The clips 30 preferably extend the length of the panel and are held in place by spaced rods 36 extending through the base, and press-on clamps 37.

In the embodiment illustrated, the bolts 22 have a first nut 39 for holding the heat collector and clips to the base, and a second nut 40 for holding a panel support strip 41. The support strip 41 is not necessary but does provide for mounting the panels at an angle, as shown in FIG. 2.

The cover is easily installed by sliding one edge into one of the clips and then bending the cover to slide the opposite edge into the opposite clip. In the preferred embodiment illustrated, the clip is positioned so that there is a pressure engagement between the cover and the base at the corners 45 providing seals between the cover and base along the opposite edges of the air space 42. The ends of the air space may be closed by caps 43 mounted at the ends of the base.

Also, the clips 30 are preferably positioned so that the entire clip is below the top surface of the base. This configuration serves to prevent moisture from entering the air space. The cover serves to protect the heat collector from the elements so that the heat absorbing surface does not deteriorate. The cover also serves to maintain an insulating barrier of air over the heat collector to reduce heat loss to the surrounding atmosphere. The configuration of FIG. 3 provides a good compression seal at the corners 45 with the simple flat cover and clip.

Figure 4:
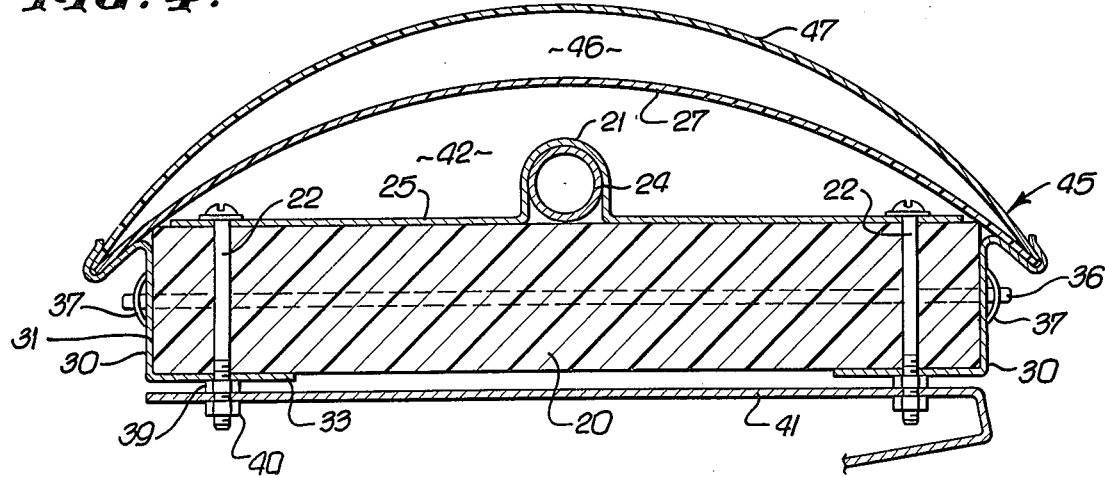
FIG. 4 is a view similar to that of FIG. 3 showing an alternative embodiment of the heating panel of the invention.

An alternative embodiment is shown in FIG. 4 where a second cover 47 is carried in the clips 30 spaced above the cover 27. This construction provides a second air space 46 between the covers 27, 47 for additional insulation from the atmosphere.

I claim:

1. In a solar heating panel, the combination of:
   an elongate insulating base having a top and opposite edges;
   a cover;
   means for mounting said cover on said base at said opposite edges with said cover in sealing engagement with said base defining an air space between said cover and base,
   said cover mounting means including a clip at each opposite edge of said base, each of said clips having a first portion engaging said base and a second portion projecting outwardly and downwardly from said base with a channel for receiving the edge of said cover;
a heat collector mounted on said base; and
means for closing the ends of said air space.

2. A solar heating panel as defined in claim 1 wherein each of said clips has a third portion at right angles to said first portion and projecting under said base, and including means for joining said heat collector, base and clip third portion to a support strip.

3. A solar heating panel as defined in claim 1 wherein said cover is flexible to an arcuate position for sliding insertion into said channels of said clips.

4. In a solar heating panel, the combination of:
an elongate insulating base having a top and opposite edges;
a cover;
means for mounting said cover on said base at said opposite edges with said cover projecting downward below said top defining an air space between said cover and base;
said cover mounting means including a clip at each opposite edge of said base, each of said clips having a first portion engaging said base and a second portion projecting outwardly and downwardly from said base with a channel for receiving the edge of said cover;
a heat collector mounted on said base; and
means for closing the ends of said air space.

5. A solar heating panel as defined in claim 4 wherein said cover is flexible to an arcuate position for sliding insertion into said channels of said clips.

6. A solar heating panel as defined in claim 4 wherein said heat collector comprises a tube with a metal heat absorbing plate affixed thereto.

* * * * *